US009527150B2

(12) United States Patent
Kimura et al.

(10) Patent No.: US 9,527,150 B2
(45) Date of Patent: Dec. 27, 2016

(54) METHOD FOR MANUFACTURING TERMINAL-STRIP-EQUIPPED ELECTRONIC COMPONENT AND TERMINAL-STRIP-EQUIPPED ELECTRONIC COMPONENT (71) Applicant: MURATA MANUFACTURING CO., LTD., Kyoto (JP)

(72) Inventors: Nobumichi Kimura, Kyoto (JP); Masuyoshi Houda, Kyoto (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 164 days.

(21) Appl. No.: 14/331,585

(22) Filed: Jul. 15, 2014

(65) Prior Publication Data
US 2015/0055274 A1 Feb. 26, 2015

(30) Foreign Application Priority Data

Aug. 20, 2013 (JP) .................................. 2013-170086
Mar. 20, 2014 (JP) .................................. 2014-057416

(51) Int. Cl.
*B23K 1/00* (2006.01)
*H01G 4/30* (2006.01)
(Continued)

(52) U.S. Cl.
CPC ............ *B23K 1/0016* (2013.01); *B23K 1/008* (2013.01); *B23K 3/0638* (2013.01);
(Continued)

(58) Field of Classification Search
CPC ............ H01G 4/232; H01G 4/30; H01G 4/12; B23K 1/008; B23K 20/023
See application file for complete search history.

(56) References Cited

U.S. PATENT DOCUMENTS 5,394,608 A * 3/1995 Tottori ................ H01L 25/0657
257/692
6,839,218 B2 * 1/2005 Satoh ...................... B23K 1/19
361/306.1

(Continued)

FOREIGN PATENT DOCUMENTS

JP 60062145 A * 4/1985
JP 01144608 A * 6/1989
(Continued)

*Primary Examiner* — David M Sinclair
(74) *Attorney, Agent, or Firm* — Studebaker & Brackett PC (57) ABSTRACT

A method for manufacturing a terminal-strip-equipped electronic component in which terminal strips made of a metal plate are bonded with solder to terminal electrodes of an electronic chip component on two opposing end surfaces. Solder cream is applied to outer surfaces of the terminal electrodes. The terminal strips are thermocompression bonded to the terminal electrodes by placing the electronic chip component between the terminal strips and pressing the terminal strips against the terminal electrodes using a pair of heating elements so as to obtain an electronic component to which the terminal strips are temporarily fixed. The terminal strips are fully fixed to the electronic component by melting the solder cream as a result of heating the electronic component in a heating furnace so as to obtain a terminal-strip-equipped electronic component.

11 Claims, 7 Drawing Sheets (51) Int. Cl.
    *H01G 4/232*    (2006.01)
    *B23K 1/008*    (2006.01)
    *B23K 3/06*    (2006.01)
    *B23K 20/02*    (2006.01)
    *B23K 20/16*    (2006.01)
    *H01G 4/12*    (2006.01)

(52) U.S. Cl.
    CPC ............ *B23K 20/023* (2013.01); *B23K 20/16* (2013.01); *H01G 4/232* (2013.01); *H01G 4/30* (2013.01); *B23K 2201/42* (2013.01); *H01G 4/12* (2013.01)

(56) References Cited

U.S. PATENT DOCUMENTS

| | | |
|---|---|---|
| 2008/0179382 A1 | 7/2008 | Galvagni et al. |
| 2008/0239621 A1* | 10/2008 | Tajuddin ................. H01G 2/06 361/306.1 |
| 2009/0296311 A1 | 12/2009 | Otsuka et al. |
| 2010/0091429 A1* | 4/2010 | Koga .................... H01G 4/012 361/321.2 |
| 2012/0043854 A1 | 2/2012 | Otsuka et al. |

FOREIGN PATENT DOCUMENTS

| | | |
|---|---|---|
| JP | 2002-280274 A | 9/2002 |
| JP | 2008-205455 A | 9/2008 |
| JP | 2008294180 A * | 12/2008 |
| JP | 2010-016326 A | 1/2010 |

\* cited by examiner

METHOD FOR MANUFACTURING TERMINAL-STRIP-EQUIPPED ELECTRONIC COMPONENT AND TERMINAL-STRIP-EQUIPPED ELECTRONIC COMPONENT

CROSS REFERENCE TO RELATED APPLICATIONS

This application claims benefit of priority to Japanese Patent Application 2013-170086 filed on Aug. 20, 2013, and to Japanese Patent Application 2014-057416 filed on Mar. 20, 2014, the entire content of each of which is incorporated herein by reference.

TECHNICAL FIELD

The present technical field relates to a method for bonding terminal strips to an electronic chip component and particularly to an improvement in a method for soldering terminal strips to terminal electrodes of an electronic component.

BACKGROUND

A typical method for mounting an electronic chip component, such as a ceramic capacitor, on a circuit board is to perform surface mounting with which terminal electrodes of an electronic component are directly soldered onto a land of a circuit board. However, this method can cause problems such as cracking of an electronic component or separation of terminal electrodes from the body of an electronic component due to causes such as a stress that occurs due to a difference in coefficient of thermal expansion between the circuit board and the electronic component or a stress that occurs due to a bend of the circuit board.

A method employed for addressing the above-described problems is to reduce the stress on an electronic component by bonding terminal strips, made of an elastic metal plate, to the terminal electrodes of the electronic component from both sides in such a manner that the strips are opposed to each other and by mounting the terminal strips on a circuit board.

Examples of a method for bonding the above-described terminal strips to the terminal electrodes include the followings: a method for soldering terminal strips to terminal electrodes (for example, Japanese Unexamined Patent Application Publication No. 2002-280274); a method for soldering terminal strips to terminal electrodes by preparing a lead frame to which a large number of terminal strips are coupled and causing an electronic component to pass through a reflow furnace in a state where the electronic component is held between the terminal strips (Japanese Unexamined Patent Application Publication No. 2008-205455); and a method for directly diffusion-bonding terminal electrodes and terminal strips to one another using heating and electric conduction while the terminal electrodes and the terminal strips are brought into contact with one another (Japanese Unexamined Patent Application Publication No. 2010-016326).

Japanese Unexamined Patent Application Publication No. 2002-280274 discloses a method of soldering terminal strips to terminal electrodes of an electronic component with molten solder while the terminal strips are being pressed against the terminal electrodes by a pair of pressing members. In this case, the terminal strips are soldered to the terminal electrodes while being pressed against the terminal electrodes and thus the bonding strength is excellent. In the case of, however, bonding terminal strips to a large number of electronic components, a heating furnace has to contain the electronic components against each of the terminal strips as the terminal strips are pressed by a pair of pressing members. Thus, equipment for continuously pressing and holding electronic components and terminal strips is required inside the heating furnace, leading to high costs and low productivity. This method also involves an increase in heat loss due to the need for large heat capacity to accommodate the pressing members.

Japanese Unexamined Patent Application Publication No. 2008-205455 discloses a method of soldering terminal strips to an electronic component by forming a large number of terminal strips that are coupled to a lead frame, holding the electronic component between the terminal strips with solder, and inserting the electronic component held between the terminal strips into a heating furnace. The lead frame is then cut off the terminal strips. This method does not involve pressing of individual electronic components using pressure members and thus enables a reduction of equipment costs compared to those in the case of Japanese Unexamined Patent Application Publication No. 2002-280274. This method, however, may not provide highly reliable soldering since the terminal strips are soldered to the electronic component while the electronic component is being held by only the spring elasticity of the lead frame and thus the terminal strips are not firmly pressed against and attached to the terminal electrodes. Moreover, the preparation of the lead frame including a large number of terminal strips has a high cost and the lead frame cut off after soldering is not reusable and thus wasteful.

Japanese Unexamined Patent Application Publication No. 2010-016326 discloses a method for diffusion-bonding terminal electrodes and terminal strips to one another without using solder. The method is free from the problems incidental to soldering. However, in order to achieve diffusion bonding having a desired bonding strength, the following conditions are required: a duration of conduction of 300 ms to 1000 ms; a welding pressure of 30 N to 50 N; and a maximum temperature at a joint portion within the range of approximately 700° C. to 900° C. (paragraph 0047). Performing pressing and attachment under such a high temperature and a high pressure highly damages the electronic component. If the electronic component is a ceramic electronic component, the electronic component can be subjected to a larger number of defects such as cracks. If metal in the terminal strips is sufficiently diffused into the terminal electrodes while the electronic component is prevented from being damaged, it takes a relatively long bonding time of 1 sec or more, thereby possibly leading to low productivity.

The present disclosure thus aims to provide a method for manufacturing a terminal-strip-equipped electronic component that can solve the above-described problems of various bonding methods and provide a terminal-strip-equipped electronic component.

SUMMARY

The present disclosure was made to solve the problems involved in existing bonding methods. The present disclosure enables an improvement of the productivity and the reliability of bonding and a reduction of damages to an electronic component by using two-step bonding including temporary fixing by thermocompression bonding using heating elements and full fixing by solder melting using a heating furnace.

Specifically, according to an aspect of the disclosure, a method for manufacturing a terminal-strip-equipped electronic component includes a first step of preparing an electronic chip component including terminal electrodes on two opposing end surfaces; a second step of preparing a pair of terminal strips made of a metal plate; a third step of applying solder cream to outer surfaces of the terminal electrodes or inner surfaces of the terminal strips; a fourth step of thermocompression bonding the terminal strips to the terminal electrodes by placing the electronic chip component between the terminal strips and pressing the terminal strips against the terminal electrodes using a pair of heating elements so as to form an electronic component to which the terminal strips are temporarily fixed; and a fifth step of fully fixing the terminal strips to the electronic component by heating the electronic component to which the terminal strips are temporarily fixed in a heating furnace and melting the solder cream so as to obtain a terminal-strip-equipped electronic component.

Firstly, an electronic chip component and a pair of terminal strips are prepared. Subsequently, solder cream (or solder paste) is applied to either one of or both of an outer surface of each terminal electrode and an inner surface of the corresponding terminal strip. The application here may be performed using widely known dispensers or by other methods. The amount of solder to be applied may be smaller than the amount of solder usually applied since a large part of the applied solder is extruded to the periphery of the thermocompression-bonded portion during the temporary fixing. Subsequently, the electronic component is placed between the terminal strips. Here, preferably, a predetermined gap is left between each electronic terminal and the corresponding terminal strip so as to prevent removal of the solder cream applied to either one of or both of the outer surface of each terminal electrode and the inner surface of the corresponding terminal strip. Subsequently, the terminal strips are thermocompression bonded to the terminal electrodes by pressing the terminal strips against the terminal electrodes using a pair of heating elements.

Thermocompression bonding herein means metallically bonding surfaces of two separate metal plates by diffusing metal constituting the terminal strips (including, for example, parent metal and a plating layer formed on the surface of the parent metal) into metal constituting the terminal electrodes (including, for example, sintered metal and a plating layer formed on the surface of the sintered metal). The thermocompression bonding may not necessarily be performed over the entire area of the opposing surfaces of each terminal strip and the corresponding terminal electrode and may only be performed over a partial area. In the thermocompression bonding, solder cream interposed between the electronic component and the terminal strips is extruded outward and the electronic component and the terminal strips have been temporarily fixed together. Part of the solder cream may melt in the thermocompression bonding, but not the entire solder cream since the thermocompression bonding is completed in a short time.

In an aspect of the present disclosure, the temporary fixing is performed to thermocompression bond the terminal strips to the terminal electrodes by pressing the terminal strips against the terminal electrodes using a pair of heating elements. Thus, the heat and pressure of the heating elements are directly transmitted to the terminal electrodes through the terminal strips. In addition, the thermocompression bonding is performed only on a partial area of the opposing surfaces of each terminal strip and the corresponding terminal electrode and thus completed in a short time.

The thermocompression bonding requires neither a time and an amount of heat for melting the entire solder nor a time for sufficiently fixing the terminal strips and the terminal electrodes together, unlike in the case of diffusion bonding described in Japanese Unexamined Patent Application Publication No. 2010-016326. The duration of thermocompression bonding may usually be 300 ms or shorter, although it varies depending on the size of the electronic component, the thickness of the terminal strips, or the area to be bonded. The welding pressure in the thermocompression bonding is not required to be as high as the pressure disclosed in Japanese Unexamined Patent Application Publication No. 2010-016326. This is because the bonding strength resulting from the thermocompression bonding only has to be sufficiently high to prevent displacement between the electronic component and the terminal strips during transportation for full fixing or during full fixing. Consequently, the degree of damages to the electronic component during the temporary fixing can be reduced, whereby the occurrence of cracks can be reduced.

The electronic component and the terminal strips temporarily fixed together are thermally treated in a heating furnace and thus the solder cream melts. Due to the capillarity of melted solder and the wettability of the metal surface, the solder fills gaps between the terminal electrodes and the terminal strips, so that the terminal electrodes and the terminal strips are fully fixed together. The electronic component and the terminal strips, which have been temporarily fixed together, do not have to be held by jigs or other devices during the transportation after the temporary fixing for the full fixing and during the full fixing. In other words, the electronic component can be heated without being held during melting of solder (at full fixing). Thus, an arrangement of electronic components can be omitted and a large number of electronic components can be heated at a time, whereby the production efficiency is significantly improved. Since the terminal strips have a simple shape and do not require complex processing, unlike lead frames, costs for the terminal strips can be largely reduced. The method according to an aspect of the disclosure dispenses with holding individual electronic components with pressure or preparing jigs for arranging electronic components or lead frames, thereby achieving simple equipment and low costs. Such effects become move obvious as electronic components become increasingly smaller. Since the use of jigs for holding electronic components is omitted in the full fixing, the heating furnace can be sized smaller, the heat capacity can be reduced, and the duration for heating can be reduced. The heating furnace in the present disclosure does not have to be a furnace having an enclosed space. The heating furnace only has to maintain the time and temperature for completely melting solder on the electronic component to which the terminal strips have been temporarily fixed.

In this manner, with a method according to an aspect of the present disclosure, the electronic component and the terminal strips are bonded together by firstly temporarily fixing together by thermocompression bonding and secondly fully fixing together with melted solder. Thus, the electronic component and the terminal strips are bonded together with a higher bonding strength than a bonding structure in which an electronic component and terminal strips are bonded together by only soldering, thereby increasing the reliability in bonding. Even when residual stress occurs in the terminal electrodes of the electronic component or the terminal strips due to the thermocompression bonding, the residual stress can be reduced by heat at the time of melting of solder, whereby residual stress in the final products can be reduced.

In the fifth step, multiple electronic components to each of which the terminal strips have been temporarily fixed may be thermally treated at one time. In an aspect of the present disclosure, the terminal strips and the electronic component have been temporarily fixed together. Thus, electronic components do not need to be arranged or held at certain intervals for full fixing. By thermally treating by subjecting multiple electronic components at one time, the duration of thermal treatment for each electronic component can be reduced, whereby the productivity is improved. In addition, since this method does not require jigs for arranging electronic components, the heat capacity can be reduced and the duration of thermal treatment can be reduced. The heating furnace may be a batch furnace or a continuous furnace.

The maximum temperature at the thermocompression bonding in the fourth step may be higher than the maximum temperature at the heating (for example, reflow) in the fifth step. The maximum temperature at the thermocompression bonding may be, for example, the temperature for heating elements or the maximum temperature of a thermocompression-bonded portion at which the terminal strips and the terminal electrode are thermocompression bonded together. The duration of the thermocompression bonding can be reduced by increasing the maximum temperature during the thermocompression bonding compared to the maximum temperature at reflow. Since the duration of thermocompression bonding is short, solder cream can be prevented from entirely melting in the fourth step. By increasing the maximum temperature at the thermocompression bonding compared to the maximum temperature at reflow, the thermocompression-bonded portion can be prevented from being detached at the reflow.

A multilayered plating layer including a plurality of layers made of different types of metal may be formed on at least one of a surface of each of the terminal electrodes and a surface of the corresponding strip of the terminal strips, the surfaces opposing each other, and the multilayered plating layer may be alloyed by the thermocompression bonding without solder for temporary fixing. Preferably, an inner plating layer functions as a barrier metal layer and an outer plating layer has an excellent wettability. The multilayered plating layer is alloyed in shorter time than in the case where metal in parent metal of the terminal strips is dispersed into the terminal electrodes, as described in Japanese Unexamined Patent Application Publication No. 2010-016326. Thus, temporary fixing can be completed in a short time while a predetermined bonding strength can be maintained.

Plating layers made of the same type of metal may be respectively disposed at outermost layers of the terminal electrodes and the terminal strips. The plating layers serving as the outermost layers may be metallically bonded together by the thermocompression bonding and alloyed with plating layers covered by the outermost layers. Since the plating layers made of the same type of metal are bonded first, thermocompression bonding can be completed in short time, thereby facilitating alloying the layers together.

An inner Ni plating layer and an outer Sn plating layer may each be disposed over the surfaces of the terminal electrodes and the surfaces of the terminal strips. The Sn plating layer over the surface of each terminal electrode and the Sn plating layer over the surface of the corresponding terminal strip may be bonded together by the thermocompression bonding so as to form a Sn—Ni alloy. The Ni plating layer also functions as a barrier metal layer. Since Sn is a metal having an excellent wettability and relatively low melting point, Sn can be bonded by thermocompression bonding in short time and alloyed.

Preferably, thermocompression bonding is performed at a temperature at which the plating layer of each terminal strip and the plating layer of the corresponding terminal electrode can be alloyed together in short time and at a pressure within the range of 10 N to 30 N. If the thermocompression bonding for temporary fixing is performed at a low temperature or at a low welding pressure, the terminal strips and the terminal electrodes may fail to be thermocompression bonded together in short time and may be detached during transportation for the full fixing or during the full fixing. When the terminal strip and the terminal electrode are pressed against each other at the temperature at which the plating layer of each terminal strip and the plating layer of the corresponding terminal electrode are alloyed together and at the pressure of 10 N to 30 N, the terminal strip and the terminal electrode are thermocompression bonded together in short time. Thus, the electronic component and the terminal strips can be prevented from being displaced with respect to each other during the transportation for the full fixing and during the full fixing. Moreover, a high bonding strength can be obtained after the solder melting bonding. Since the welding pressure exerted on the electronic component is prevented from being excessive, damages to the electronic component can be reduced. Unlike in the case of Japanese Unexamined Patent Application Publication No. 2010-016326, this method does not involve dispersion of metal in the parent metal of the terminal strips into metal in the terminal electrodes. Thus, the temporary fixing can be completed in as short as, for example, 300 ms.

A surface of each terminal electrode opposing the corresponding strip of the terminal strips may be convex and the terminal strip and the terminal electrode may be thermocompression bonded together at an apex of the convex surface. Terminal electrodes of a chip component are typically formed by applying electrode paste on end surfaces of the chip component and burning the electrode paste. At this time, the electrode paste is likely to be concentrated on center portions of the terminal electrodes due to the surface tension, whereby the terminal electrodes are likely to have protruding center portions, i.e., a convex shape. While thermocompression bonding according to an aspect of the present disclosure is performed, an inner surface of each terminal strip firstly comes into contact with a center portion of the convex surface of the corresponding terminal electrode and is thermocompression bonded to the center portion of the convex surface. Since the heat energy and the welding pressure are concentrated on the center portions, the thermocompression bonding is completed in short time. Since the terminal electrodes have a convex surface, solder cream interposed between the terminal strips and the terminal electrodes is immediately extruded toward the periphery at the thermocompression bonding and held in pockets, which are gaps between the terminal strips and the terminal electrodes. Thus, the solder cream is prevented from protruding beyond the terminal strips.

The third step may be a step of applying solder cream to the outer surfaces of the terminal electrodes. The method may further include a step of preheating the electronic component and the solder cream between the third step and the fourth step. Preheating the solder improves the wettability while preheating the electronic component enables a reduction of thermal shock to the electronic component during the thermocompression bonding. The preheating temperature may be lower than the maximum temperature of the joint portion during the thermocompression bonding.

The fourth step may be performed in a non-oxidative atmosphere. In this case, solder and the plating layers (if formed) can be prevented from being oxidized during the thermocompression bonding, whereby the wettability is improved and the plating layers are excellently bonded together during the thermocompression bonding. Thus, the duration of temporary fixing can be further reduced. The non-oxidative atmosphere is, for example, a reducing gas atmosphere or an inert gas atmosphere and may be, for example, a $N_2$ atmosphere.

As described above, the present disclosure enables both an improvement of the productivity and the reliability of bonding and a reduction of damages to an electronic component by using two-step bonding including temporary fixing by thermocompression bonding using heating elements and full fixing by solder melting using a heating furnace when terminal strips are bonded to terminal electrodes of an electronic chip component.

Other features, elements, characteristics and advantages of the present disclosure will become more apparent from the following detailed description of preferred embodiments of the present disclosure with reference to the attached drawings.

DETAILED DESCRIPTION

Referring now to the drawings, an embodiment of the present disclosure is specifically described below.

Figure 1:
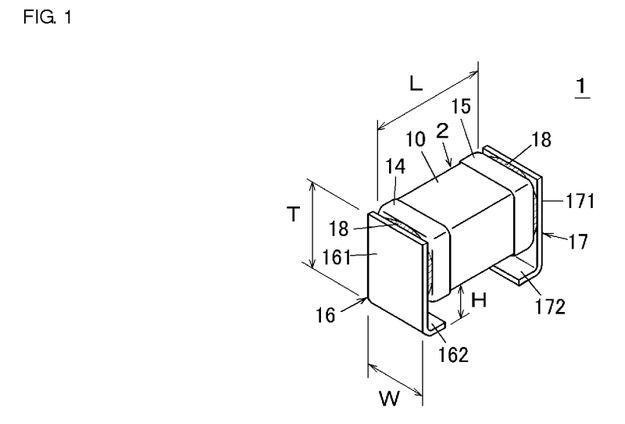
FIG. 1 is a perspective view of an example of a terminal-strip-equipped electronic component according to an embodiment of the present disclosure.
Figure 2:
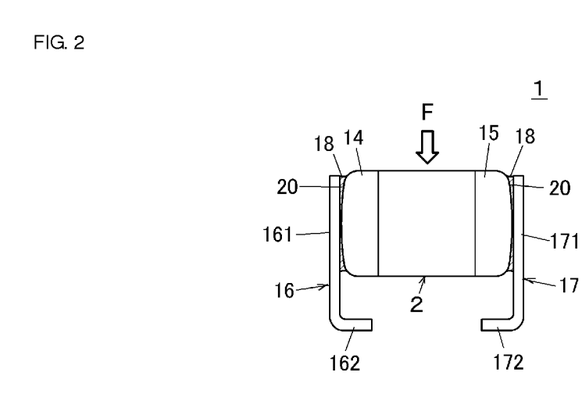
FIG. 2 is a front view of the terminal-strip-equipped electronic component illustrated in FIG. 1.

As illustrated in FIG. 1 and FIG. 2, a terminal-strip-equipped electronic component 1 according to an embodiment of the present disclosure includes an electronic chip component 2 and a pair of terminal strips 16 and 17. The electronic component 2 includes a substantially rectangular-parallelepiped ceramic element body 10. The ceramic element body 10 includes, for example, a plurality of stacked ceramic layers and a plurality of internal electrodes 10a and 10b arranged between the ceramic layers. The structure and the materials of the ceramic layers or internal electrodes are publicly known and thus not described here. The electronic chip component 2 may be any chip component having terminal electrodes on both end surfaces, such as a multi-layer ceramic capacitor, a chip inductor, or a chip thermistor.

Figure 3:
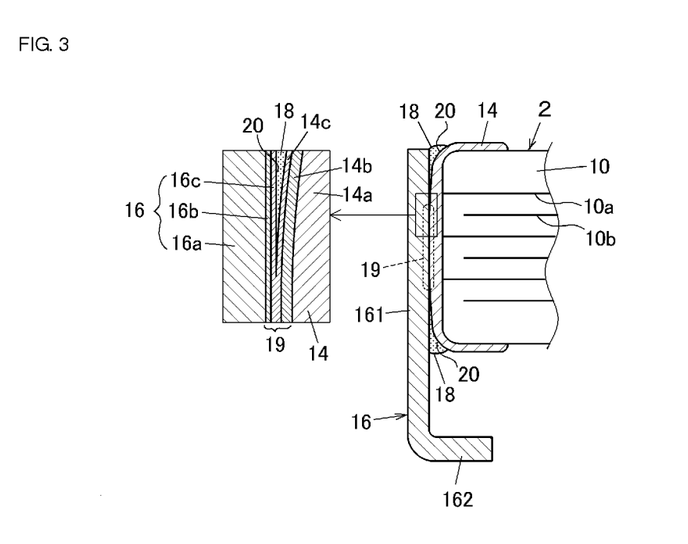
FIG. 3 schematically illustrates an example of the state where a first terminal electrode and a first terminal strip are bonded together when viewed in a cross section.

As illustrated in FIG. 3, the internal electrodes 10a and 10b are formed so as to be parallel to the mount surface. The internal electrodes 10a are drawn out to a first end surface of the ceramic element body 10 and electrically connected to a first terminal electrode 14 disposed on the first end surface. Here, the first terminal electrode 14 covers not only the first end surface but also part of four side surfaces of the ceramic element body 10 adjacent to the first end surface. Similarly, the internal electrodes 10b are drawn out to a second end surface of the ceramic element body 10 and electrically connected to a second terminal electrode 15 disposed on the second end surface. Here, the second terminal electrode 15 also covers not only the second end surface but also part of four side surfaces of the ceramic element body 10 adjacent to the second end surface.

As illustrated in FIG. 3 (including only a portion near the first terminal electrode 14), each of the first and second terminal electrodes 14 and 15 according to this embodiment includes a sintered metal 14a, an inner plating layer 14b disposed on the sintered metal 14a, and an outer plating layer 14c disposed on the inner plating layer 14b. The sintered metal 14a is made of a metal such as Cu, Ag, or Pd (may contain glass). The inner plating layer 14b is made of a metal such as Ni and serves as a barrier metal layer. The outer plating layer 14c is made of a metal such as Sn and has an excellent wettability. The sintered metal 14a, the inner plating layer 14b, and the outer plating layer 14c may be made of not only a single metal but also an alloy mainly containing the metal. The surface of the terminal electrode 14 has a convex shape such that the center portion protrudes. Since the sintered metal 14a is convex-shaped, the surfaces of the inner plating layer 14b and the outer plating layer 14c each disposed on the sintered metal 14a at a substantially uniform thickness have a convex shape, accordingly. Although not illustrated in FIG. 3, the structure of the terminal electrode 15 is similar to that of the terminal electrode 14.

As illustrated in FIG. 1 and FIG. 2, a first terminal strip 16 is bonded to the first terminal electrode 14 and a second terminal strip 17 is bonded to the second terminal electrode 15. The first and second terminal strips 16 and 17 have an L shape. The first terminal strip 16 includes a joint portion 161 bonded to the terminal electrode 14 and a mount portion 162 mounted on a circuit board or the like, not illustrated. The second terminal strip 17 includes a joint portion 171 bonded to the terminal electrode 15 and a mount portion 172 mounted on a circuit board or the like, not illustrated. In this example, the mount portions 162 and 172 are bent inward at substantially right angles. In FIG. 1, for example, the length L of the electronic component 2 is set at 2.2 mm, the height T of the terminal strips is set at 1.75 mm, the width W of the terminal strips is set at 1.25 mm, and the height H from the mount portion to the lower surface of the electronic component 2 is set at 0.5 mm.

As illustrated in FIG. 3, each of the first and second terminal strips 16 and 17 includes a parent metal 16a and an inner plating layer 16b and an outer plating layer 16c disposed over the surface of the parent metal 16a. The plating layers 16b and 16c are only required to extend over at least areas of the inner surfaces of the terminal strips 16 and 17 that face the terminal electrodes 14 and 15 for the purposes of thermocompression bonding and solder bonding, which are described below. Nevertheless, the plating layers 16b and 16c may be formed throughout the entirety of the terminal strips 16 and 17 including the mount portions 162 and 172 so as to be applicable to the case where the terminal strips 16 and 17 are mounted on a circuit board or the like. The parent metal 16a is selected in consideration of the suitability as terminal strips such as the mechanical strength, the elasticity, or the thermal resistance. For example, a metal plate made of Fe-18Cr or Fe-42Ni having a thickness of 0.05 mm to 0.5 mm may be used. The inner plating layer 16b functions as a barrier metal layer. The inner plating layer 16b is desirably made of, for example, Ni or an alloy mainly containing Ni and may have a thickness within the range of 0.5 μm to 2 μm. The outer plating layer 16c is desirably made of a material having an excellent characteristic in thermocompression bonding and an excellent wettability such as Sn or an alloy mainly containing Sn and may have a thickness of 2 μm to 4 μm. Each of the inner plating layer and the outer plating layer may include a plurality of plating layers.

As illustrated in FIG. 3, the terminal electrode 14 and the terminal strip 16 are fixed and attached to each other by thermocompression bonding at a center portion of the convex surface of the terminal electrode 14 and by solder 18 at the periphery of the center portion. The outer plating layers 14c and 16c of the terminal electrode 14 and the terminal strip 16 are bonded together at a thermocompression-bonded portion 19 at which the terminal electrode 14 and the terminal strip 16 are thermocompression bonded together and at at least part of which the outer plating layers 14c and 16c are bonded without using solder 18. In the thermocompression-bonded portion, the outer plating layers 14c and 16c are alloyed with the inner plating layers 14b and 16b. Specifically, the outer plating layers 14c and 16c (for example Sn) of the terminal strip 16 and the terminal electrode 14 are alloyed together by being bonded together and concurrently allowing metal (for example, Ni) in the inner plating layers 14b and 16b to diffuse into the outer plating layers 14c and 16c. Although not illustrated in FIG. 3, the bonding structure between the terminal electrode 15 and the terminal strip 17 is similar to the bonding structure between the terminal electrode 14 and the terminal strip 16.

The solder 18 may be selected from any solder having a higher melting point than solder used for mounting a component on a circuit board, such as from among Sn—Sb solder, Sn—Ag—Cu solder, Sn—Cu solder, and Sn—Zn—Al solder. The thermocompression-bonded portion 19 is positioned at substantially the center of the opposing surfaces of the terminal electrode 14 and the terminal strip 16. The solder 18 is gathered in a pocket 20, which is a gap formed around the thermocompression-bonded portion 19 between the terminal electrode 14 and the terminal strip 16, and spread out over substantially the entire areas of the opposing surfaces of the terminal electrode 14 and the terminal strip 16, excluding the thermocompression-bonded portion 19. Although the solder 18 and the outer plating layers 14c and 16c are illustrated as separate layers in FIG. 3, they actually constitute an integrated alloy layer.

Figure 4:
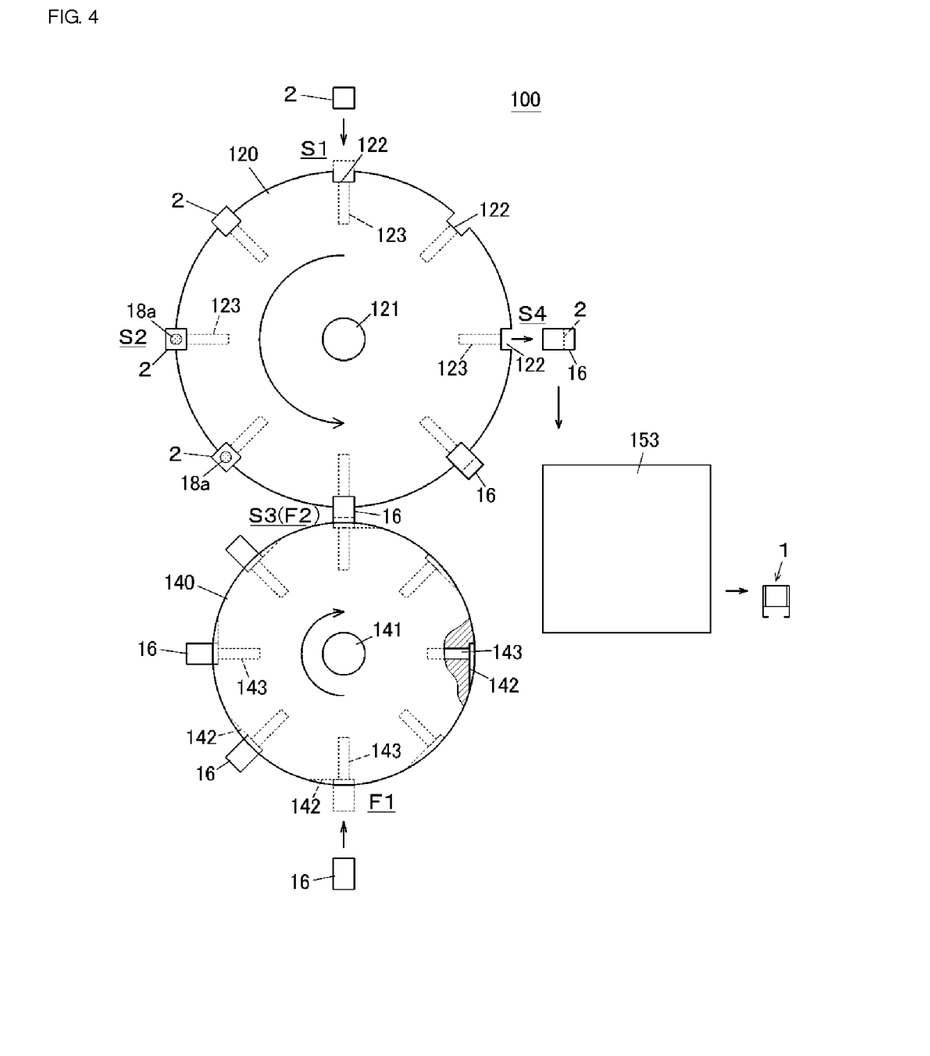
FIG. 4 is a front view of an example of an apparatus that performs the method for bonding the terminal strips according to an embodiment of the present disclosure.

Referring now to FIGS. 4 and 5A through 5G, a method for bonding terminal strips according to an embodiment of the present disclosure will be described. FIG. 4 is a front view of a bonding apparatus 100 and FIGS. 5A through 5G illustrate operations of each component of the bonding apparatus 100. FIGS. 4 and 5A through 5G are schematic diagrams for the purpose of illustration of the mere operation principle and do not necessarily illustrate the actual apparatus.

A disc-shaped index 120 is disposed at an upper portion of the bonding apparatus 100 to supply electronic components 2 and a disc-shaped index 140 is disposed at a lower portion of the bonding apparatus 100 to supply terminal strips 16 and 17. The indexes 120 and 140 respectively include horizontal rotation shafts 121 and 141 and rotate at predetermined pitches in a synchronized manner in opposite directions around their rotation shafts.

A plurality of (in FIG. 4, eight) recesses 122 are formed at every predetermined angle in the peripheral direction at the peripheral portion of the electronic-component-supply index 120. A suction hole 123 is formed in the bottom surface of each recess 122. The depth of the recess 122 (thickness of the peripheral portion of the index 120) is determined to such a depth that both end portions of each electronic component 2 protrude from the recess 122.

Figure 6A:
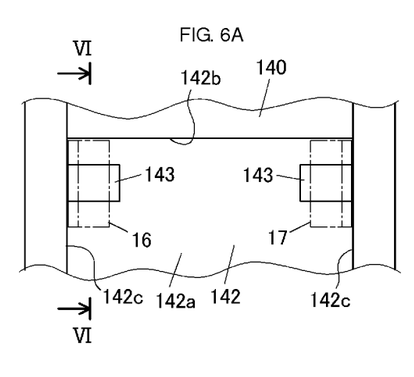
FIG. 6A is a front view of a terminal-strip supplying index when viewed in a peripheral direction and FIG. 6B is a cross-sectional view of the terminal-strip supplying index taken along the line VI-VI.
Figure 6B:
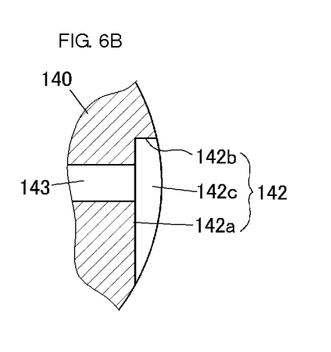

A plurality of (in FIG. 4, eight) retention grooves 142 are formed at every predetermined angle in the peripheral direction in the peripheral portion of the terminal-strip supplying index 140. Suction holes 143 are formed in a flat bottom surface 142a of each retention groove 142. As illustrated in FIG. 6B, each retention groove 142 according to this embodiment has an L-shaped cross section having a back wall surface 142b on a downstream side in the rotation direction and side wall surfaces 142c on both sides in the axis direction. As illustrated in FIG. 6A, the suction holes 143 are formed in a pair on the left and right sides and the bottom surface of each of the terminal strips 16 and 17 (bottom surface of each mount portion) is sucked and held at the corresponding suction hole 143. The terminal strips 16 and 17 are positioned in the opposing directions as a result of the back surfaces of the terminal strips 16 and 17 coming into contact with the side wall surfaces 142c of the retention grooves 142 in the axis direction. The terminal strips 16 and 17 are positioned in the circumferential direction as a result of first side edges of the terminal strips 16 and 17 coming into contact with the back wall surface 142b of the retention grooves 142. Besides the L-shaped cross section according to this embodiment, the retention grooves 142 may have any shape with which the bottom surfaces of the mount portions of the terminal strips 16 and 17 can be stably sucked and held.

As illustrated in FIG. 6A, the suction hole 143 according to this embodiment extends further inward than the bottom surface of each of the terminal strips 16 and 17 and thus the suction hole 143 is partially open without being covered by the mount portion of each of the terminal strips 16 and 17. This configuration enables regulation of the suction force exerted on the terminal strips. Thus, the terminal strips 16 and 17 can be prevented from being inclined during the thermocompression bonding, described below, even when the pressure center C1 of the heating elements 152 is positioned further upward from the center of gravity of each of the terminal strips 16 and 17. Nevertheless, each suction hole 143 may have a shape that is completely closed with the bottom surface of the corresponding strip of the terminal strips 16 and 17.

Figure 5A:
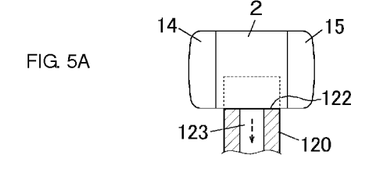
FIGS. 5A through 5G illustrate the operation of the apparatus illustrated in FIG. 4 in each step.

A supply portion S1, at which electronic components 2 are supplied, is disposed at the uppermost portion of the electronic-component-supply index 120. At the supply portion S1 electronic components 2 are supplied to the recesses 122. The electronic components 2 are held one by one at the center portions of the recesses 122. FIG. 5A illustrates this state. The electronic components 2 may be supplied to the recesses 122 in the circumferential direction as illustrated in FIG. 4 or in the direction perpendicular to the plane of FIG. 4.

Figure 5B:
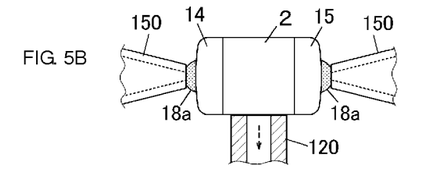

The index 120 that holds each electronic component 2 rotates in the direction of the arrow in FIG. 4 and the electronic component 2 is provided with solder cream 18a on its both end surfaces at, for example, a position S2 substantially 90° from the supply portion S1. In other words, as illustrated in FIG. 5B, a pair of dispenser nozzles 150 approach from both sides of the electronic component 2 and eject solder cream 18a from their tips to apply the electronic component 2 with a predetermined amount of solder cream 18a at substantially center portions of the terminal electrodes 14 and 15. The amount of solder to be applied is such a degree as to fill the pockets 20, which are gaps between the terminal electrode 14 and 16 and the terminal strips 16 and 17. Thus, the amount of solder to be applied is smaller than that in the existing soldering method (for example, see Japanese Unexamined Patent Application Publication Nos. 2002-280274 and 2008-205455).

A detecting device (not illustrated) may be provided, that detects the application state of the solder cream 18a applied to both end portions of the electronic component 2 before the electronic component 2 to which the solder cream 18a has been applied arrives at the lowermost position S3 (at which Step S3 of thermocompression bonding is performed).

Figure 5C:
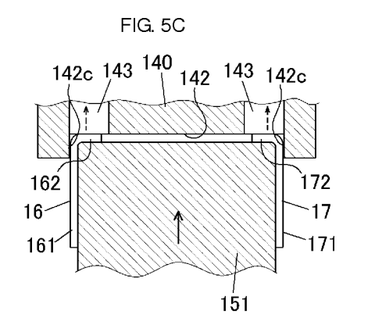

On the other hand, a supply portion F1 that supplies terminal strips 16 and 17 is disposed at the lowermost position of the terminal-strip supplying index 140. A pusher 151 pushes up terminal strips 16 and 17 from the lower side toward the index 140 and presses the mount portions 162 and 172 of the terminal strips 16 and 17 against the bottom surface of the respective retention grooves 142 of the index 140. Then, the pusher 151 is withdrawn, so that the terminal strips 16 and 17 are transferred to the index 140. At this stage, as illustrated in FIG. 5C, the back surfaces of the terminal strips 16 and 17 are sucked and held at such positions as to be in contact with the side wall surfaces 142c of the retention groove 142. Thus, the distance between the joint portions 161 and 171 of the terminal strips 16 and 17 is larger than the full length of the electronic component 1 to which the solder cream 18a has been applied, which is described below. The index 140 that holds the terminal strips 16 and 17 rotates in the direction opposite to the direction of rotation of the index 120 to transport the terminal strips 16 and 17 upward.

Figure 5D:
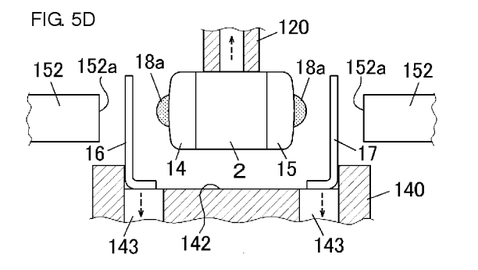

After the solder cream 18a is provided to both end surfaces of the electronic component 2, the electronic-component-supply index 120 rotates, for example, at approximately 90° from the position S2 and the electronic component 2 arrives at the lowermost position S3 and, concurrently, the terminal strips 16 and 17 held by the terminal-strip supplying index 140 also arrive at the uppermost position F2. The position at which both indexes 120 and 140 are closest is a thermocompression bonding position S3 at which the Step S3 (F2) of thermocompression bonding is performed. At this stage, as illustrated in FIG. 5D, the electronic component 2 is accurately placed at a center portion of a space between the terminal strips 16 and 17. The terminal strips 16 and 17 face each other with such a gap interposed therebetween that the terminal strips 16 and 17 do not come into contact with the solder cream 18a applied to the terminal electrodes 14 and 15. A pair of heating elements 152 for thermocompression bonding is disposed on the outer sides of the terminal strips 16 and 17. A pressing surface 152a of the tip of each heating element 152 may have any shape such as a rectangular, circular, or elliptic shape. Preferably, the pressing surface 152a has such an area with which a portion at least including the apex of the convex terminal electrode 14 or 15 can be pressed. Each heating element 152 is heated so that the pressing surface 152a has a temperature suitable for thermocompression bonding. Any heating method such as resistance heating or induction heating may be employed. The temperature of the pressing surface 152a is desirably determined to such a temperature that the outer plating layers are bonded and alloyed in short time and preferably, for example, so as to fall within the range of approximately 300° C. to 450° C., although it may vary depending on the material of the outer plating layers. Preferably, the maximum temperature during thermocompression bonding is higher than the maximum temperature at reflow, which is described below.

Figure 5E:
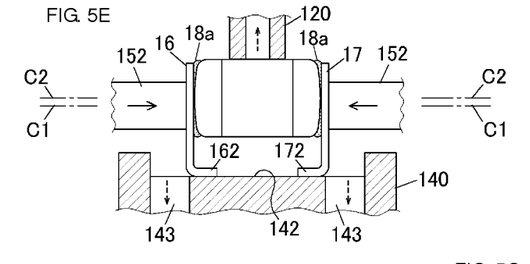
Figure 5F:
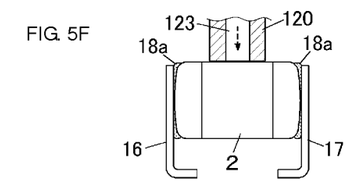

At the thermocompression bonding position S3 (F2), immediately after the electronic component 2 is placed between the terminal strips 16 and 17, the left and right heating elements 152 are concurrently operated in such directions as to come close to each other to press the terminal strips 16 and 17 against the electronic component 2 (see FIG. 5E. At this time, the terminal strips 16 and 17 are translated along the bottom surface of the retention groove 142 of the index 140 in such directions as to come close to each other and thus the flat inner surfaces of the terminal strips 16 and 17 are tightly pressed against both end surfaces (terminal electrodes) of the electronic component 2. As described above, the terminal electrodes 14 and 15 have a convex curve. Thus, the apexes of the convex surfaces are firmly pressed against the terminal strips 16 and 17 and thus the outer plating layers are bonded together and alloyed with the inner plating layers to form the thermocompression-bonded portion 19. The duration of thermocompression bonding may be as short as or shorter than 300 ms. The solder cream 18a interposed between the terminal electrodes 14 and 15 and the terminal strips 16 and 17 is extruded to the periphery of the thermocompression-bonded portions 19 as a result of being pressed by the heating elements 152 and is held in the pockets 20, which are gaps between the terminal electrodes 14 and 15 and the terminal strips 16 and 17. At this stage, the solder cream 18a may melt partially but not entirely. Both heating elements 152 may have the same welding pressure but one of the heating elements 152 may have a larger welding pressure than the other and the welding pressure of the other heating element 152 may be adjusted with reference to the larger welding pressure.

As illustrated in FIG. 5E, preferably, the pressure center c1 of each heating element 152 is offset toward the mount portion (downward) from the center axis C2 of the electronic component 2. If the heating elements 152 press the electronic component 2 while the centers C1 of the heating elements 152 are leveled with the center axis C2 of the electronic component 2, the terminal strips 16 and 17 and the terminal electrodes 14 and 15 may be thermocompression bonded together while the terminal strips 16 and 17 are inclined since the bottom surfaces of the terminal strips 16 and 17 are sucked and held by the index 140. Offsetting the pressure center C1 of each heating element 152 toward the mount portion can prevent the terminal strips 16 and 17 from being inclined. Preferably, the offset is determined to such an amount that the pressing surface 152a of each heating element 152 can almost always press a portion including the apex of the convex surface of the corresponding strip of the terminal electrodes 14 and 15. The pressure center C1 may be positioned further upward than the center of gravity of each of the terminal strips 16 and 17 or may be leveled with the center of gravity.

A preheating step may be provided immediately before thermocompression bonding to preheat the electronic component and the solder cream 18a. Preferably, the preheating temperature is determined to such a temperature that the wettability is improved and thermal shock exerted on the electronic component 2 during the thermocompression bonding can be reduced. Furthermore, the indexes 120 and 140 may be disposed in a room filled with an inert atmosphere gas (for example $N_2$). In this case, the solder cream 18a and the plating layers on the surfaces of the terminal electrodes of the electronic component 2 and on the terminal strips can be prevented from being oxidized.

After the thermocompression bonding, a portion of the terminal strips 16 and 17 temporarily fixed to the electronic component 2 are transferred to the index 120. At this time, the bottom surfaces of the terminal strips 16 and 17 no longer cover the suction holes 143 of the index 140 (see FIG. 5E, and thus terminal strips 16 and 17 can be prevented from remaining in the index 140. At the ejection position S4 of the index 120, for example, approximately 90° rotated from the thermocompression bonding position S3, vacuum suction at the suction hole 123 is switched to compressed-air ejection and thus the electronic component 2 to which a portion of the terminal strips 16 and 17 have been temporarily fixed is ejected from the index 120 (see FIG. 5F). The electronic component 2 held at the recess 122 may be removed using an air ejection hole formed in the index 120 separate from the suction hole 123, or using a blowing device that blows air toward the index 120 in a perpendicular direction. Alternatively, a quality checker may be disposed at a position between the thermocompression bonding position S3 and the ejection position S4 and the ejection portion may be divided into a fine-product ejection portion and a poor-product ejection portion. Here, only products determined as fine by the quality checker may be ejected from the fine-product ejection portion.

A heating furnace 153 is disposed near the ejection position S4 of the electronic-component-supply index 120. The electronic component 2 (to which the terminal strips have been temporarily fixed) ejected from the index 120 is inserted into the heating furnace 153 and subjected to reflow at the temperature at which the solder cream 18a melts. A transportation unit such as a shooter or a belt conveyer may be disposed between the ejection position S4 and the heating furnace 153. The heating furnace 153 may be a reflow furnace or an oven. During transportation of the electronic component to the heating furnace 153 or reflow inside the heating furnace 153, the terminal strips 16 and 17 are not detached from the electronic component 2 even though a certain amount of force is exerted on the electronic component 2 and the terminal strips 16 and 17 because the electronic component 2 and the terminal strips 16 and 17 have been temporarily partially fixed to each other by thermocompression bonding. Thus, the electronic component 2 and the terminal strips 16 and 17 do not have to be arranged and held during thermal treatment in the heating furnace 153. Moreover, a large number of electronic components 2 (to which terminal strips have been temporarily fixed) can be collectively subjected to soldering. Thus, the thermal treatment is facilitated and the productivity is significantly improved compared to the existing case.

Figure 5G:
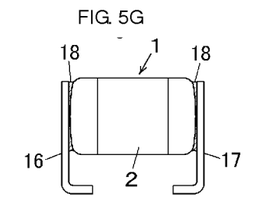

FIG. 5G illustrates the electronic component 1 subjected to reflow. The solder 18 that has melted by the reflow fully fills the pockets 20 between the terminal electrodes 14 and 15 and the terminal strips 16 and 17 due to the capillarity and the wettability of the metal surface, whereby the terminal electrodes 14 and 15 and the terminal strips 16 and 17 can be firmly fully fixed together.

Figure 7:
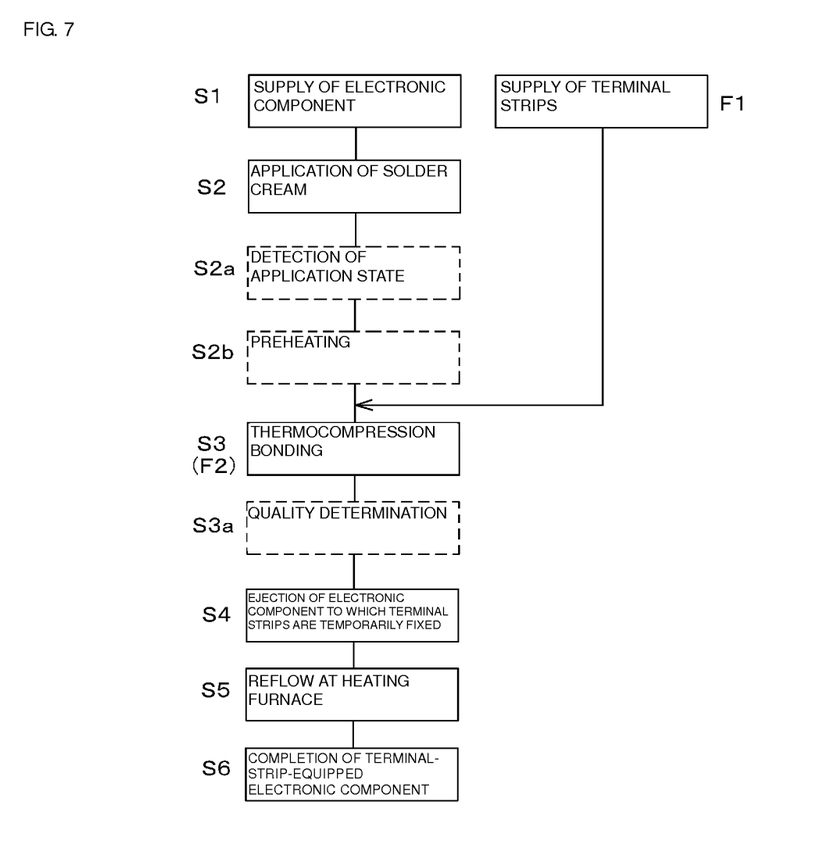
FIG. 7 is a flow chart of steps of a method for manufacturing a terminal-strip-equipped electronic component according to an embodiment of the present disclosure.

FIG. 7 is an example of a flow chart of steps for manufacturing a terminal-strip-equipped electronic component according to an embodiment of the present disclosure. Firstly, an electronic component 2 is supplied to the index 120 (Step S1). Solder cream 18a is applied to the terminal electrodes of the electronic component 2 (Step S2). After the application of the solder cream 18a, the application state may be detected (Step S2a) or the solder cream may be preheated (Step S2b). Besides the electronic component 2, terminal strips 16 and 17 are supplied to the index 140 (Step F1). The electronic component 2 and the terminal strips 16 and 17 are then transported to the thermocompression bonding position S3 (F2) to be thermocompression bonded together (Step S3 (F2)). After the thermocompression bonding, the quality of the temporary bonding state may be determined (Step S3a). Then, the electronic component to which the terminal strips have been temporarily partially fixed is ejected from the index 120 (Step S4) and the electronic component to which the terminal strips have been temporarily partially fixed is inserted into the heating furnace (Step S5) to heat and melt the solder cream so that the terminal strips are firmly fully fixed to the electronic component. This completes the terminal-strip-equipped electronic component (Step S6).

Table 1 show a comparison in bonding strength between terminal-strip-equipped electronic components according to an existing method (the strips are bonded using a lead frame) and terminal-strip-equipped electronic components according to an embodiment of the present disclosure (the strips are bonded using thermocompression bonding). The bonding strength was compared with regard to displacement (rotation) of the electronic component with respect to the terminal strips, observed after the terminal-strip-equipped electronic component has been transported through a reflow furnace at the peak temperature of 270° C. while being weighted (loaded) in the direction illustrated with the arrow F in FIG. 2. Ceramic capacitors sized in 2.0 mm×1.25 mm×1.25 mm were used as the electronic components.

In the electronic components bonded by the method according to an embodiment of the present disclosure (involving thermocompression bonding), the terminal strips were not displaced (rotated) even when the load was increased from 33 mg to 265 mg. On the other hand, in the electronic components according to an existing method in which the strips are bonded using only solder "without pressure", approximately 20% of the components had displacement of the terminal strips with an application of the load of 265 mg. These results show that a combination of temporary fixing and full fixing according to an embodiment of the present disclosure yields a higher bonding strength than an existing method.

TABLE 1

Results of Chip Fall-Off Evaluation

| Load condition | Example (involving thermocompression bonding) | Existing component (without pressure) |
| --- | --- | --- |
| Load: 33 mg (1.7 times) | None fell off (n = 5) | None fell off (n = 5) |
| Load: 265 mg (13 times) | None fell off (n = 5) | Chip rotated in 1 of 5 components Others did not fall |

The embodiment described above is merely one form of the present disclosure and the present disclosure can be naturally embodied in various other forms. For example, the above embodiment has described an example in which the surfaces of the terminal electrodes of an electronic component are curved in a convex and the terminal electrodes and the terminal strips are thermocompression bonded together at the apexes of the surfaces. However, in the case where the terminal electrodes have substantially flat surfaces, the terminal strips formed in advance so as to be curved inward may be used or the heating elements may have a convexly curved pressing surface so that heat and pressure exerted during the thermocompression bonding are concentrated on one portion. Also in such cases, a pocket can be formed around the thermocompression-bonded portion.

The above embodiment has described an example in which solder cream is applied by dispensers to outer surfaces of the terminal electrodes. However, the solder cream may be applied to the inner surfaces of the terminal strips. In this case, the solder cream may be applied to the terminal strips before the terminal strips are supplied to the index 140. In addition, the solder cream may be applied by not only dispensers but any other devices.

In the above-described embodiment, outer plating layers (Sn) having the same composition are disposed over the surfaces of the terminal strips and the terminal electrodes. However, plating layers having different compositions may be disposed over these surfaces or the plating layer over one of the terminal strips and the terminal electrodes may be omitted. In the former case, plating layers having different compositions are alloyed together and thus thermocompression bonded together. In the latter case, the plating layer over one of the terminal strips and the terminal electrodes is alloyed with the parent metal of the other and thus thermocompression bonded together.

The structure of the terminal-strip-equipped electronic component is not limited to the one illustrated in FIGS. 1 and 2. For example, a set of multiple electronic components arranged side by side may be fixed by being sandwiched between a pair of terminal strips. Also in such a case, the multiple electronic components can be temporarily fixed to the terminal strips at a time in one operation of thermocompression bonding.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for manufacturing a terminal-strip-equipped electronic component, comprising:
    a first step of preparing an electronic chip component including terminal electrodes on two opposing end surfaces;
    a second step of preparing a pair of terminal strips made of a metal plate;
    a third step of applying solder cream to outer surfaces of the terminal electrodes or inner surfaces of the terminal strips;
    a fourth step of thermocompression bonding the terminal strips to the terminal electrodes by placing the electronic chip component between the terminal strips and pressing the terminal strips against the terminal electrodes using a pair of heating elements so as to form an electronic component to which the terminal strips are temporarily fixed; and
    a fifth step of fully fixing the terminal strips to the electronic component by heating the electronic component to which the terminal strips are temporarily fixed in a heating furnace and melting the solder cream so as to obtain a terminal-strip-equipped electronic component.

2. The method according to claim 1, wherein, in the fifth step, a plurality of electronic components to each of which the terminal strips have been temporarily fixed are thermally treated at one time.

3. The method according to claim 1, wherein a maximum temperature during the thermocompression bonding in the fourth step is higher than a maximum temperature during the heating in the fifth step.

4. The method according to any claim 1,
    wherein a multilayered plating layer including a plurality of layers made of different types of metal is disposed over at least one of a surface of each of the terminal electrodes and a surface of the corresponding strip of the terminal strips, the surfaces opposing each other, and
    wherein the multilayered plating layer is alloyed by the thermocompression bonding at at least a portion of the opposing surfaces of the terminal electrode and the terminal strip.

5. The method according to claim 4,
    wherein plating layers made of a same type of metal are respectively disposed at outermost layers of the terminal electrodes and the terminal strips, and
    wherein the plating layers serving as the outermost layers are metallically bonded together by the thermocompression bonding and are alloyed with inner plating layers covered by the outermost layers.

6. The method according to claim 4,
    wherein an inner Ni plating layer and an outer Sn plating layer are each disposed over the surfaces of the terminal electrodes and the surfaces of the terminal strips, and
    wherein the Sn plating layer over the surface of each terminal electrode and the Sn plating layer over the surface of the corresponding terminal strip are bonded together by the thermocompression bonding so as to form a Sn—Ni alloy.

7. The method according to claim 1,
    wherein a surface of each terminal electrode opposing the corresponding strip of the terminal strips is convex, and
    wherein the terminal strip and the terminal electrode are thermocompression bonded together at an apex of the convex surface.

8. The method according to claim 1,
    wherein the third step is a step of applying solder cream to the outer surfaces of the terminal electrodes, and
    wherein the method further comprises a step of preheating the electronic component and the solder cream between the third step and the fourth step.

9. The method according to claim 1, wherein the fourth step is performed in a non-oxidative atmosphere.

10. A terminal-strip-equipped electronic component, comprising:
    an electronic chip component including terminal electrodes on two opposing end surfaces; and
    a pair of terminal strips made of a metal plate and bonded to the terminal electrodes with solder,
    an outer surface of each of the terminal electrodes and an inner surface of the corresponding strip of the terminal strips being thermocompression bonded together at a center portion of the terminal electrode, and
    the outer surface of the terminal electrode and the inner surface of the terminal strip being bonded together with the solder at a periphery of a center portion of the terminal electrode subjected to the thermocompression bonding.

11. The terminal-strip-equipped electronic component according to claim 10,
    wherein a surface of each terminal electrode opposing the corresponding strip of the terminal strips is convex, wherein the terminal strip and the terminal electrode are thermocompression bonded together at an apex of the convex surface, wherein a pocket is formed between the terminal strip and the terminal electrode at the periphery of the center portion of the terminal electrode subjected to the thermocompression bonding, and wherein the pocket is filled with the solder.

\* \* \* \* \*